No. 817,416. PATENTED APR. 10, 1906.
C. E. CATHER & L. H. BUCKLEY.
SLEEVE PROTECTOR.
APPLICATION FILED OCT. 19, 1903.

Witnesses
Roy D. Tolman
Penelope Comberbach

Inventors
Charles E. Cather
Louis H. Buckley
By Rufus B. Fowle
Attorney

UNITED STATES PATENT OFFICE.

CHARLES E. CATHER AND LOUIS H. BUCKLEY, OF WORCESTER, MASSACHUSETTS.

SLEEVE-PROTECTOR.

No. 817,416.      Specification of Letters Patent.      Patented April 10, 1906.

Application filed October 19, 1903. Serial No. 177,528.

*To all whom it may concern:*

Be it known that we, CHARLES E. CATHER and LOUIS H. BUCKLEY, citizens of the United States, residing at Worcester, in the county of Worcester and Commonwealth of Massachusetts, have invented a new and useful Improvement in Sleeve-Protectors, of which the following is a specification, accompanied by drawings forming a part of the same, in which—

Figure 1:
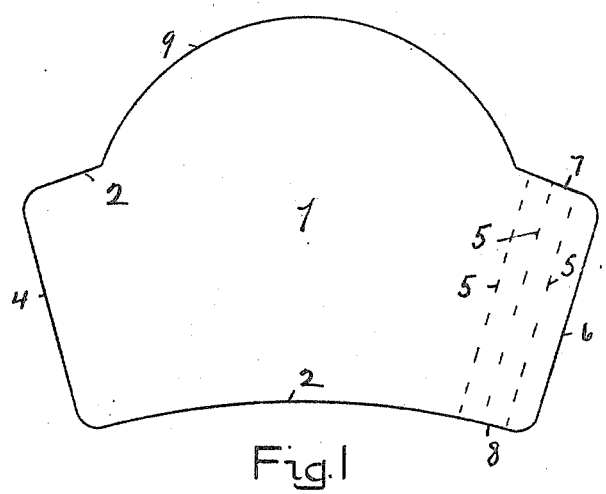
Figure 2:
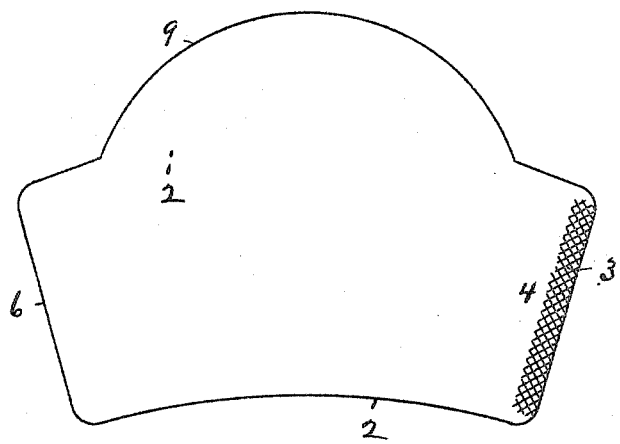
Figure 3:
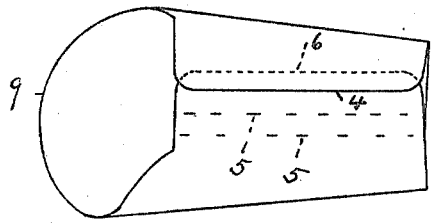

Figure 1 represents the outer or obverse side of a sleeve-protector embodying our invention before the ends are united to form its final or cuff shape. Fig. 2 represents the inner or reverse side of a sleeve-protector embodying our invention before the ends are united to form its final or cuff shape; and Fig. 3 represents a sleeve-protector embodying our invention with the ends united, showing the method of determining the size of the sleeve-protector in the cuff shape by the guide-marks shown in Fig. 1.

Similar reference-figures refer to similar parts in the different views.

Our present invention relates to that class of sleeve-protectors which are formed from a blank cut in a predetermined shape and size and adapted to be fitted over the sleeve or cuff to be protected by joining the ends and fastening them together.

Referring to the accompanying drawings, 1 denotes the blank, which may be cut in any required shape or size and of any convenient material, but is preferably formed on a general curve with the lines 2 2 as the arcs of circles from a common center, so that it may be more easily fitted to the sleeve.

3 denotes a surface at the end 4 of the blank, having adhesive material applied thereto and so arranged that when it is desired to use the sleeve-protector said adhesive substance may be used to fasten the ends together, as shown in Fig. 3. 5 5 denote guide lines or marks on the opposite end 6 of the blank and extending crosswise said end 6 at convenient distances from it.

The ends 4 and 6 of the cuff are divergent, so that when the ends are overlapped a uniform distance throughout the width of the cuff and the ends united the completed cuff will be flaring, as shown in Fig. 3. In order to enable the divergence to be determined, as well as the size of the cuff, suitable for the wearer, I place the lines 5 5 substantially across the entire width of the cuff and parallel with the divergent end 6 of the cuff. The lines 5 5 are also placed on that side which is to form the outside of the cuff when the ends are united. The opposite end of the cuff is provided with adhesive material 3, arranged in a narrow strip parallel to the end of the cuff, said strip being of slightly less width than the space between the end 6 and the first of the lines 5, so that when the ends are overlapped on the first of the lines 5 the entire adhesive surface will be overlapped by the opposite end of the cuff. The adhesive material 3 is applied on the side of the cuff opposite the lines 5 5 or on the inside of the cuff. The cuff as an article of manufacture is supplied in a flat or extended form, as shown in Figs. 1 and 2, and the cuff is completed by the wearer to fit the size of arm or sleeve to be covered and having the requisite amount of flare demanded by a tight or a flowing sleeve. The purposes of said lines or marks 5 5 are, first, to serve as guides in adjusting and fitting the sleeve-protector to be used by wrapping the cuff around the arm and overlapping the ends to produce the desired size and flare of the cuff to receive the sleeve, noting the position of the end 4 to the guide-lines 5 5, by which the amount of overlap is determined, while the alinement of the end 4 with the lines 5 5 will also indicate the amount of flare of the cuff. The cuff is then removed from the arm and the two ends are overlapped in the same manner and amount as before removal, and the ends are united by means of the adhesive material 3.

By means of our improvement we are enabled to accurately adjust the cuff on the arm before the ends are united and after its removal to overlap the ends under the same conditions and attach the ends together, applying sufficient pressure to the adhering surfaces to cause a secure union of the two ends.

Said guide-marks 5 5 may of course be solid lines across the end 6 of the sleeve-protector or broken lines, as shown in Fig. 1, or they may consist simply of marks on the outer and inner edges 7 and 8 of the blank without any connecting-lines either solid or broken, or said marks may be arranged in any other convenient way to accomplish the purposes above set forth.

9 denotes a swell or projection on that side 7 of the blank which is designed to be farther from the hand; but such swell or projection 9 is not material to our invention.

In the use of a sleeve-protector embodying our invention the blank 1 is fitted to the arm and sleeve which it is desired to protect, the position of the end 4 in relation to the guide-marks 5 5 being noted with regard both to the amount of lap and also to the angle of divergence of said end 4. The blank 1 is then removed from the arm and the end 4 is fastened by means of the adhesive surface 3 to the end 6 in the same position with reference to the guide-marks 5 5 that said end 4 occupied while the blank 1 was on the arm. The sleeve-protector now assumes the general appearance and cuff shape of Fig. 3, except that the relation of the end 4 to the guide-marks 5 5 of course varies with the varying arms and sleeves upon which the sleeve-protector is to be worn.

What we claim as our invention, and desire to secure by Letters Patent, is—

As an article of manufacture, a sleeve-protector, consisting of a sheet of cardboard having divergent ends, a series of guide-lines extending transversely across said sheet and contiguous to and parallel with one of its divergent ends, and a narrow strip of adhesive material on the opposite side of said sheet contiguous to and parallel with its opposite end.

Dated this 16th day of October, 1903.

CHARLES E. CATHER.
LOUIS H. BUCKLEY.

Witnesses:
PENELOPE COMBERBACH,
RUFUS B. FOWLER.